United States Patent Office 3,037,871
Patented June 5, 1962

---

3,037,871
POLYAMIDE RESIN BINDER FOR
PRINTING INKS
Don E. Floyd, Robbinsdale, and David W. Glaser, St. Paul, Minn., assignors to General Mills, Inc., a corporation of Delaware
No Drawing. Filed Jan. 13, 1959, Ser. No. 786,452
7 Claims. (Cl. 106—26)

This invention relates to resin compositions as binders for printing inks and particularly to polyamide resins derived from blends of dimerized fatty acids and dimerized rosin acids.

Printing inks such as flexographic inks are solvent-based inks applied by rubber rollers or pads to flexible sheets of plastic, foil and paper. Many printing processes have been developed in the past and are available for printing on a wide number of surfaces. With the recent development of plastic films and the uses of such materials in packaging, flexographic inks have come into greater prominence because the equipment used for flexographic printing offers a useful and convenient method for printing on such plastic surfaces. Plastic films are smooth, non-porous in the main, and very thin (of the order 2 to 3 thousandths of an inch thick). For this reason they do not have enough "give" for smooth printing from hard metal plates. Special flexographic printing from rubber plates is preferred. Because of the rubber used in flexographic printing one must be very careful about the choice of solvents. Most presently used flexographic presses have natural rubber rollers and natural rubber is attacked or softened by a large variety of solvents including aromatic and aliphatic hydrocarbons, ketones, and esters. Unfortunately, these solvents are commonly used for dissolving many resins.

Some of the desirable properties of a resin binder in printing inks are as follows:

(1) Resin should adhere well to plastic films to give high gloss, rapid dry and a resistant attractive surface.
(2) Resin should be stable on aging or chilling.
(3) Resin should be compatible with the many modifying agents which may be used.
(4) In inks which are applied with rubber rollers, such as flexographic inks, the resin should be soluble in solvents which do not attack rubber rollers.

The solvents which may be used include the alcohols such as ethanol, isopropanol, and normal propanol and blends of these same alcohols with very small amounts of other solvents such as aliphatic hydrocarbons or esters. Often it is allowable to use a small amount of modifying solvent such as hydrocarbon or ester if special synthetic rubber plates are to be used for the flexographic press.

Historically, shellac was one of the first resins thought to be suitable as a binder in flexographic inks. It was alcohol soluble, had fair gloss, and adhered reasonably well to paper but did not adhere well to plastic films, especially polyethylene, and was attacked readily by water and water vapor. Later a change was made to a synthetic type of polyamide resin made by reaction of dimerized fatty acids and ethylene diamine. The polyamide resin was soluble in isopropanol, normal propanol, higher alcohols and blends of these alcohols with certain other solvents, gave a high gloss, excellent adhesion and fast dry, but suffered from two defects: First, the resin binder in this case was not soluble enough at low temperatures in alcoholic solvents to permit storage out-of-doors in cold weather. Second, limited compatibility was shown with modifying resins.

It has now been discovered that a polyamide resin derived from a combination of dimerized fatty acids and dimerized rosin acids provides a binder for printing inks which has definite advantages over available resinous materials in solubility, gloss, hardness, stability and compatibility with many modifying agents.

Accordingly it is an object of this invention to provide a polyamide resin suitable for use as a binder for printing inks.

It is also an object of this invention to provide an improved binder for flexographic inks.

In addition it is an object of this invention to provide such a binder which is stable and compatible with various modifiers used with printing inks.

Briefly the polyamide resin useful in this invention is the reaction product of a blend of dimerized fatty acids and dimerized rosin acids with an alkalene diamine having a structural formula $H_2N(CH_2)_nNH_2$ where $n$ is from 2 to 6. While improved results are achieved with any of the diamines corresponding to the above formula the preferred diamine is ethylene diamine or where $n$ is 2.

The dimerized fatty acids employed in preparing the polyamide resins are those resulting from the polymerization of drying or semi-drying oils or the free acids or the simple aliphatic alcohol esters of these acids, for example, sources rich in linoleic acid. Suitable drying or semi-drying oils include soybean, linseed, tung, perilla, cottonseed, corn, sunflower, safflower, and dehydrated castor oil. Suitable fatty acids may also be obtained from tall oil, soap stock, and other similar materials. In the polymerization process for the preparation of dimerized fatty acids the fatty acids with sufficient double bond functionality combine for the most part, probably by a Diels-Alder mechanism, to provide a mixture of dibasic and higher polymeric fat acids. These acids are often referred to as dimers, trimers, and so forth. In place of this method of polymerization any other method of polymerization may be employed whether the resultant polymer possesses residual unsaturation or not. Illustrative methods of polymerization which may be employed are found in U.S. Patents 2,793,219 and 2,793,220. The term "polymeric fat acid" as used herein is intended to include the polymerized mixture of acids which usually contain a predominant proportion of dimer acids, a small quantity of trimer and higher polymeric fat acids and some residual monomer.

It should be appreciated that the polymeric fat acids will as a practical matter result from fatty acid mixtures that contain a preponderance of linoleic acid since the most readily available naturally occuring polyunsaturated acid is linoleic acid. It should also be appreciated that since linoleic acid occurs in nature as a complex mixture in every instance it is available in various degrees of purity ranging from relatively expensive pure linoleic acid that has been laboriously purified to crude sources such as tall oil and soap stock which contain substances other than fatty acids. One method of obtaining the linoleic rich fatty acids is by separating a major portion of the oleic and saturated fatty acids from any convenient and economical source of fatty acids having a high iodine value. In addition polymeric fat acids are readily available commercial products. One such product is "Empol 1022."

The dimerized rosin acids employed in preparing the polyamide resin are believed to have the following structural formula:

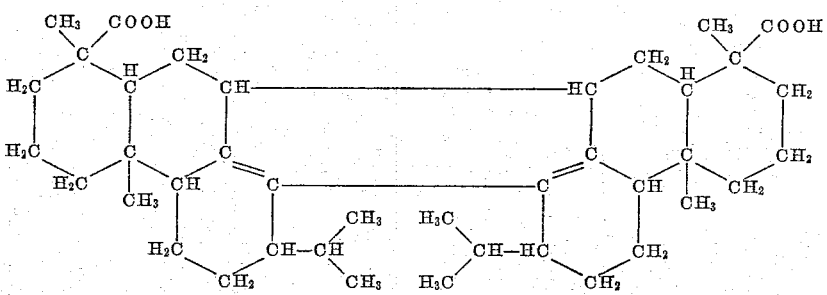

These dimerized rosin acids may further be characterized by their saponification values. The dimerized rosin acids employed in this invention have a saponification equivalent of 385. In addition dimerized rosin acids are readily available commercial products. One such product is "Dymerex Resin."

Generally the mixture of the alkylene diamine, polymeric fat acids and dimerized rosin acids are heated gradually to a temperature of from 275–300° C. and held at this temperature for about three hours. On cooling the resin is obtained.

The reaction conditions for making the polyamide resins described in this application can be varied widely. Generally the reaction can be carried on at a temperature within the range of 150–300° C. The preferred temperature is 250–300° C. At temperatures below the preferred range, reaction of the rosin dimer with amine groups to give amide groups is rather slow, leaving the product with high acid and high amine number. High acid and high amine number in themselves are not necessarily harmful although they tend to make the product reactive with certain pigments. Time of reaction may also be varied widely and will be somewhat dependent on temperature, but normally will be of the order of one-half hour to five hours after reaching the chosen temperature, the preferred range being 2 to 3 hours. Vacuum may be applied if desired to withdraw volatile by-product water or other volatile by-products and to keep the resin mixture from contact with the air.

The amount of dimerized rosin may be varied considerably. Normally less than 0.05 mol percent based on total acid has little noticeable effect. If the amount used is much greater than 0.20 mol percent the product may tend to be excessively brittle, darker in color, lower melting, and with poorer solvent release.

Acid compounds other than dimerized fatty acids and dimerized rosin acids may also be present in such compositions. Dibasic acids such as sebacic acid, isosebacic acids, isophthalic acid, adipic acid, and other aliphatic and aromatic polybasic acids may be used in small quantities to help raise melting point and increase hardness. Monobasic fatty acids of the soybean fatty acid, corn fatty acids, coconut fatty acid, cottonseed fatty acid types or individual fatty acids as found in such naturally occurring products such as lauric, myristic, stearic, oleic, and linoleic acids or mixtures thereof will serve admirably. Additional amino compounds may also be present beyond the ethylene diamine already mentioned. These amino compounds include polyamines such as diethylene triamine and higher polyamine to give increased solubility and lower melting point. Hydoxy containing amines such as 2-hydroxyethyl ethylene diamine or ethanolamine may be used since hydroxy amines tend to give somewhat greater solubility and somewhat greater compatibility with other materials. The ratios of modifying dibasic acids and monobasic acid and of amines may be varied widely. But normally it is preferred that these modifiers be restricted within a low range of the order of $1/10$ mol percent of the total acid content or $1/10$ mol percent of the total amine content.

The following examples will serve to better illustrate the invention.

EXAMPLE I

A polyamide resin was prepared by the reaction at 200° C. for three hours of a blend of one mol of dimerized fatty acids (570 grams), available commercially as Empol 1022, and one mol of ethylene diamine (60 grams) in a 3-neck flask fitted with thermometer, mechanical stirrer, and distilling column. Water was distilled out during the heating and stirring and at the end of the three hour period the reaction was approximately 95% complete as judged by the amount of by-product water collected. The resin in the flask was cooled to 150° C. under the protection of an atmosphere of nitrogen and removed from the flask. It solidified to a hard, tough solid with the following characteristics.

Melting point (ball and ring) _____° C__ 108
Amine number _____ 9
Acid number _____ 4

EXAMPLE II

To a mixture of 0.80 equivalent (228 grams) of dimerixed fatty acids known as Empol 1022, 0.20 equivalent (77.4 grams) of dimerized rosin acids known as Dymerex Resin was added one equivalent (30 grams) of ethylene diamine. This mixture was gradually heated to 300° C., in a 3-necked flask, equipped with mechanical stirrer, thermometer and distilling head, and held at that temperature for three hours. On cooling the product to room temperature a hard, amber-colored resin was obtained. It had the following characteristics:

Melting point (ball and ring) _____° C__ 97
Amine number _____ 1.0
Acid number _____ 4.5

EXAMPLE III

The procedure described in Example II was repeated with the following reaction mixture:

| | Equivalent |
|---|---|
| Dimerized fatty acids | 0.80 |
| Dimerized rosin | 0.15 |
| Sebacic acid | 0.05 |
| Ethylene diamine | 1.00 |

The resin which was obtained was a hard, amber-colored solid with:

Melting point (ball and ring) _____° C__ 94
Amine number _____ 3.7
Acid number _____ 3.1

EXAMPLE IV

The procedure described in Example II was repeated with the following reaction mixture:

| | Equivalent |
|---|---|
| Dimerized fatty acids | 0.75 |
| Rosin dimer | 0.20 |
| Sebacic acid | 0.05 |
| Ethylene diamine | 1.00 |

The resin which was obtained was a hard, amber-colored solid with:

Melting point (ball and ring) _____ °C__ 92
Amine number _____ 6.5
Acid number _____ 7.4

EXAMPLE V

The resins prepared as described in Example I–IV were compared for solubility and solution stability or resistance of solutions to gelation on aging or chilling.

Each resin was dissolved, separately, under reflux to give a 40% solution in normal propanol. The solutions in test tubes were stored at 75° F. and also at 40° F. with the following results:

| Solutions of— | Stability at 75° F. | Stability at 40° F. |
|---|---|---|
| Resin of Example I | Gel—2 days | Gel—1 day. |
| Resin of Example II | No gel—1 month | No gel—3 days. |
| Resin of Example III | -----do----- | Do. |
| Resin of Example IV | -----do----- | Do. |

EXAMPLE VI

The resins prepared as described in Examples I–IV were compared for compatibility with nitrocellulose.

A solution of SS, ½ second grade of nitrocellulose, at 20% solids, was prepared.

Grams
SS, ½ second nitrocellulose (65%) (remaining 35% is alcohol) _____ 15
Isopropyl acetate _____ 30
n-Propanol _____ 5

This nitrocellulose solution was blended with 40% solutions, in n-propanol, of the polyamide resins prepared as described in Examples I–IV. Thin films were applied to glass plates and compatibility was judged after allowing the solvent to evaporate out during one hour at room temperature.

*Compatibility of Blends*

| | Ratio of Polyamide/Nitrocellulose | | |
|---|---|---|---|
| | 8/1 | 4/1 | 2/1 |
| Resin of Example I | Comp | Borderline | Inc. |
| Resin of Example II | Comp | Comp | Comp. |
| Resin of Example III | Comp | Comp | Inc. |
| Resin of Example IV | Comp | Comp | Inc. |

Having thus described our invention, we therefore claim:

1. A composition of matter comprising a polyamide resin of equivalent amounts of an alkylene diamine having the general formula $H_2N(CH_2)_nNH_2$ where $n$ is an integer from 2 to 6 and a blend of polymeric fat acids and dimerized rosin acids, said dimerized rosin acids being employed in an amount of from .05 to .20 mol percent based on the total acid employed.

2. A printing ink having a binder, said binder comprising a polyamide resin of equivalent amounts of ethylene diamine and a blend of polymeric fat acids and dimerized rosin acids, said dimerized rosin acids being employed in an amount of from .05 to .20 mol percent based on the total amount of acid.

3. A printing ink as defined in claim 2 and further comprising nitrocellulose.

4. A method of preparing a polyamide resin comprising reacting at a temperature of from 150 to 300° C., equivalent amounts of an alkylene diamine having the general formula $H_2N(CH_2)_nNH_2$ where $n$ is an integer from 2 to 6 with a blend of polymeric fat acids and dimerized rosin acids, said dimerized rosin acids being employed in an amount of from .05 to .20 mol percent based on the total amount of acid.

5. A method as defined in claim 4 in which said blend further comprises sebacic acid.

6. A composition of matter as defined in claim 1 and further comprising up to .1 mol percent based on the total acid of a modifying agent selected from the group consisting of monobasic fatty acids having from 8 to 22 carbon atoms and dibasic acid selected from the group consisting of aliphatic and aromatic dibasic acids having from 6 to 10 carbon atoms.

7. A composition of matter as defined in claim 6 in which said dibasic acid is sebacic acid.

References Cited in the file of this patent

UNITED STATES PATENTS

| | | |
|---|---|---|
| 2,450,940 | Cowan et al. | Oct. 12, 1948 |
| 2,461,918 | Petke | Feb. 15, 1949 |
| 2,768,090 | Witcoff et al. | Oct. 23, 1956 |
| 2,788,287 | Zweig | Apr. 9, 1957 |
| 2,839,549 | Wilson | June 17, 1958 |